March 3, 1964    E. E. HILDEBRANDT    3,123,348
SUSPENSION SYSTEM
Filed Aug. 22, 1961
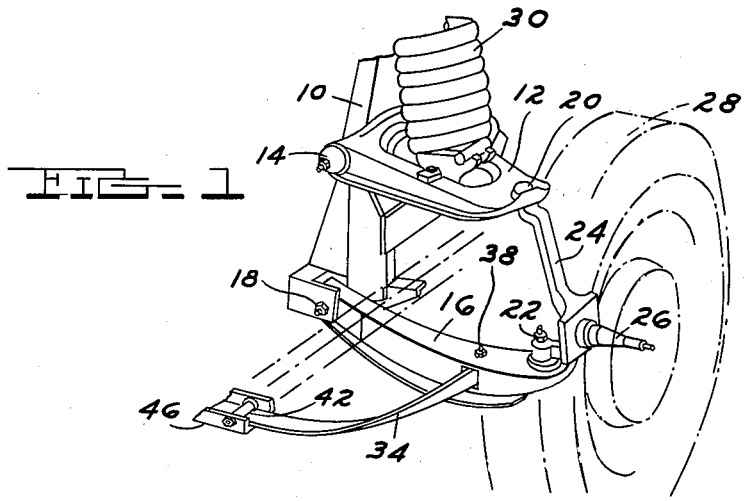
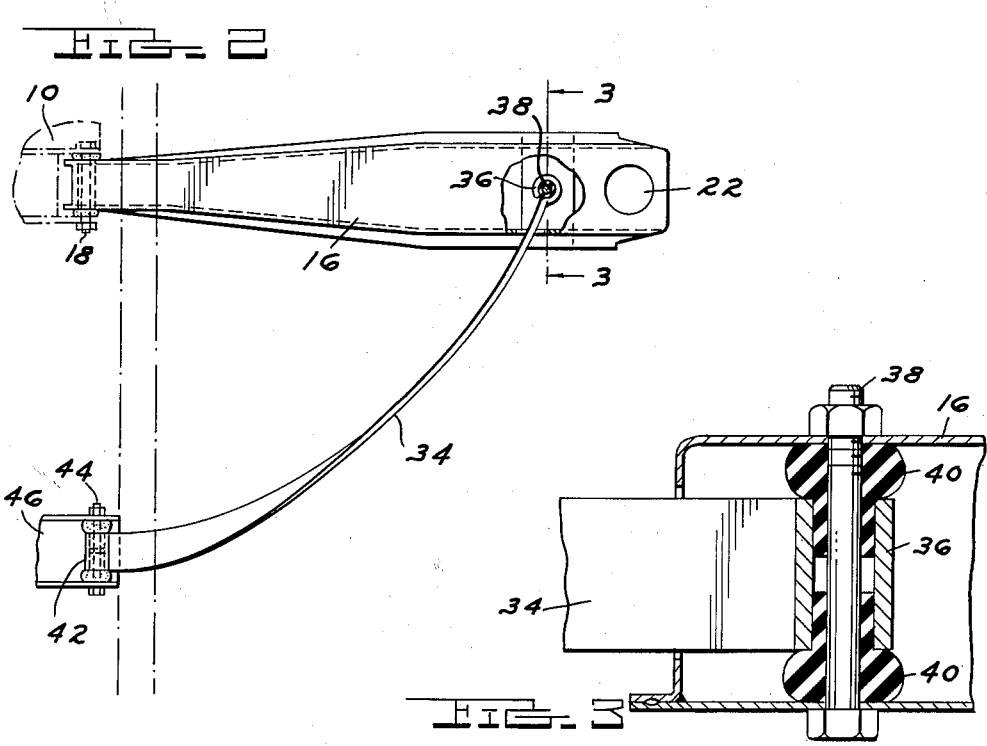
EUGENE E. HILDEBRANDT
INVENTOR.
BY John R. Faulkner
Clifford L. Sadler
ATTORNEYS

United States Patent Office 3,123,348
Patented Mar. 3, 1964

3,123,348
SUSPENSION SYSTEM
Eugene E. Hildebrandt, Northville, Mich., assignor to Ford Motor Company, Dearborn, Mich., a corporation of Delaware
Filed Aug. 22, 1961, Ser. No. 133,146
7 Claims. (Cl. 267—16)

The present invention relates to vehicle suspension systems, and more particularly, to independent suspension systems having means to permit longitudinal wheel movement.

It has been recognized in the motor vehicle art that when a road wheel of an automobile strikes an object both vertical and horizontal force components are produced upon the wheel. Conventionally the wheel is supported by a pivotally mounted suspension arm to permit vertical wheel movement. This movement is cushioned by a main suspension spring. However, such construction does not absorb the horizontal comoponent of the shock force.

Therefore, it is an object of the present invention to provide an improved independent suspension system having means to permit slight fore and aft wheel movement in response to road shocks encountered by the vehicle wheel.

More specifically, it is an object of the present invention to provide a suspension system having a laterally extending wheel support arm that is positioned longitudinally by a pivotally mounted strut. In one embodiment of the invention the strut member is formed of leaf spring stock and is bowed in its connection between the outer end of the support arm and frame structure. Because the inner end of the support arm is relatively narrow, it may move longitudinally. The leaf spring strut member controls this longitudinal movement in a resilient fashion.

These and further objects of the present invention will be more fully comprehended from the following discussion and the accompanying drawing, in which:

FIGURE 1 is a perspective view of an independent automotive suspension incorporating the presently preferred embodiment of this invention;

FIGURE 2 is a top plan view of the lower arm and drag strut of FIGURE 1; and,

FIGURE 3 is a sectional view along section lines 3—3 of FIGURE 2.

Referring now to the drawing for a more detailed understanding of this invention, FIGURE 1 discloses an independent suspension system such as might be employed to support the front wheels of an automobile. In FIGURE 1, vehicle body structure 10 has an upper suspension arm 12 pivotally connected thereto at 14. A lower suspension arm 16 is also connected to the vehicle body structure 10 by a pivot 18.

The pivots 14 and 18 secure the inner ends of the arms 12 and 16 and at their outer ends an upper ball joint 20 and a lower ball joint 22 connect to a wheel supporting spindle 24. The spindle 24 has a stud axle 26 upon which a tire and wheel combination 28 is rotatably mounted.

A coil type suspension spring 30 is seated at its lower end on the arm 28. The upper spring seat for the coil springs 30 is found in the body structure. Therefore, the vehicle body, including the frame portion 10, is resiliently supported on the road wheel 28 by the spring 30.

It will be noted from FIGURE 2 that the arm 16 is connected to the frame 10 by a rather narrow pivot 18. The pivot 18 is of the rubber bushing type to permit slight fore and aft flexibility, in addition to conventional vertical arm movement as dictated by jounce and rebound wheel action. The longitudinal position of the arm 16 is controlled by a strut 34 formed of leaf spring stock.

The outer end of the strut 34 is formed into the shape of an eye 36. The arm 16 has upper and lower openings in alignment with the eye 36 through which a pivot bolt 38 passes. Rubber bushings 40 are positioned between the eye 36 and the pivot bolt 38. It is to be noted that the connection of the strut 34 with the arm 16 has a vertical pivot axis.

The strut 34 is formed of leaf spring stock so that it may be twisted and bowed. The inner end of the strut 34 is curled into the shape of an eye 42. A pivot bolt 44 passes through the eye 42 and is secured to a frame mounted bracket 46. A rubber bushing is interposed between the eye 42 and the bolt 44. The general pivotal construction at the inner end of the strut 34 is similar to that shown in FIGURE 3 for the connection at the outer end, however, the inner end of the strut 34 has a longitudinal pivot axis.

To consider the operation of the suspension system of this invention as disclosed in FIGURE 1, assume the wheel-tire combination 28 strikes a road obstacle. This shock has both horizontal and vertical force components. The vertical components will cause the arms 12 and 16 to pivot about their longitudinal pivot axes at the inner connections 14 and 18 in a vertical direction against the resistance of the coil spring 30.

The strut 34, being connected to the arm 16, will swing vertically about the axes of bolt 44. The effect of the horizontal force component must be considered. This force will be exerted on the arm 16 causing it to cock or tend to move in a horizontal direction about the pivot 18. The pivot 18 is of the rubber bushing type and has flexibility in a horizontal direction as well as rotatability in a vertical direction. The shock will cause the arm 16 to recede or move rearwardly slightly, however, the strut 34 will resist such movement. Because the arm 34 is bowed and formed of leaf spring stock, the resistance to the horizontal or receding movement of the arm 16 will be of a resilient nature. The strut 32 will tend to straighten out under tension and exhibit a very rapid increase in resistance to longitudinal movement.

Thus, the strut 34 permits wheel compliance but provides a spring means to retard or limit horizontal wheel movement as well as to return the arm 16 to its neutral position. During normal jounce and rebound movement the strut 34 will rotate about the longitudinal pivot axis of bolt 44 in the same fashion that arm 16 moves about the pivot 18.

The foregoing description constitutes the presently preferred embodiment of this invention. Modifications and alterations may occur to those skilled in the art which will come within the scope and spirit of the following claims.

I claim:

1. A suspension system for sprung and unsprung components having a laterally extending wheel support arm, said arm having a pivotal connection with said sprung components for vertical movement, said connection being of the type to permit limited horizontal arm movement, a diagonally mounted leaf spring member interposed between said arm and said sprung components adapted to resiliently restrict horizontal arm movement, said leaf spring member being connected to said sprung component forwardly of said arm, said leaf spring member being normally bowed, said leaf spring member being connected at its one end to said arm by a connection having a vertical pivot axis and to said sprung component by a connection having a longitudinal pivot axis at its other end.

2. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a strut connected at its ends to said lateral arm and said frame at an oblique angle to said arm, said strut being adapted to resiliently restrict horizontal arm movement, said strut comprising a single band of leaf spring material having its ends twist 90° with respect to each other.

3. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a strut interposed between said lateral arm and said frame at an oblique angle to said arm, said strut being adapted to resiliently restrict horizontal arm movement, said strut comprising a single band of leaf spring material having its ends twist 90° with respect to each other, said strut being connected at one of its ends to said frame by a connection having a horizontal pivot axis and to said arm at the other of its ends by a connection having a vertical pivot axis.

4. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a strut interposed between said lateral arm and said frame at an oblique angle to said arm, said strut being adapted to resiliently restrict horizontal arm movement, said strut comprising a single band of leaf spring material having its ends twist 90° with respect to each other, said strut being normally bowed so that horizontal arm movement in one direction tends to straighten said strut, said strut being connected at one of its ends to said frame by a connection having horizontal pivot axis and to said arm at the other of its ends by a connection having a vertical pivot axis.

5. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a leaf spring connected at its ends to said lateral arm and said frame at an oblique angle to said arm, said spring being adapted to resiliently restrict horizontal arm movement, said spring being normally bowed so that horizontal arm movement in one direction tends to straighten said spring.

6. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a strut interposed between said lateral arm and said frame at an oblique angle to said arm, said strut being adapted to resiliently restrict horizontal arm movement, said strut comprising a single band or leaf spring material normally bowed so that horizontal arm movement in one direction tends to straighten said strut, said strut being connected at one of its ends to said frame by a connection having a horizontal pivot pin and to said arm at the other of its ends by a connection having a vertical pivot pin.

7. A vehicle suspension system having a chassis frame, wheel support structure and a laterally extending suspension arm interconnecting said frame and said structure, said arm having a pivotal connection with said frame for jounce and rebound vertical movement, said connection being adapted to permit limited horizontal arm movement, a main suspension spring resiliently supporting said frame upon said structure, a leaf spring interposed between said lateral arm and said frame at an oblique angle to said arm, said spring being adapted to resiliently restrict horizontal arm movement, said spring being connected at one of its ends to said frame by a connection having a horizontal pivot pin and to said arm at the other of its ends by a connection having a vertical pivot pin.

References Cited in the file of this patent

UNITED STATES PATENTS

| | | |
|---|---|---|
| 2,097,362 | Best | Oct. 26, 1937 |
| 2,305,795 | Schieferstein | Dec. 22, 1942 |
| 2,351,651 | Wulff | June 20, 1944 |
| 2,458,548 | Aronson | Jan. 11, 1949 |
| 2,461,775 | Roos | Feb. 15, 1949 |
| 2,624,592 | MacPherson | Jan. 6, 1953 |
| 3,033,587 | Perish | May 8, 1962 |

FOREIGN PATENTS

| | | |
|---|---|---|
| 107,418 | Austria | Oct. 10, 1927 |
| 564,279 | Germany | Nov. 15, 1932 |